United States Patent [19]

Kondo et al.

[11] 4,327,971
[45] May 4, 1982

[54] ELECTRO-OPTICAL LIGHT MODULATORS, LIGHT WAVELENGTH MULTIPLEX SIGNAL TRANSMITTING APPARATUS AND LIGHT WAVELENGTH SEPARATING SWITCHES UTILIZING THE SAME

[75] Inventors: Michikazu Kondo; Yoshinori Ohta; Mitsuhito Sakaguchi, all of Tokyo, Japan

[73] Assignee: Nippon Electric Co., Ltd., Tokyo, Japan

[21] Appl. No.: 44,373

[22] Filed: Jun. 1, 1979

[30] Foreign Application Priority Data

Jun. 5, 1978 [JP] Japan ................................. 53-67958
Jul. 7, 1978 [JP] Japan ................................. 53-83134

[51] Int. Cl.³ ......................... G02F 1/03; G02F 1/23
[52] U.S. Cl. ................................. 350/388; 350/392
[58] Field of Search ................................. 350/149–150, 350/356, 96.13, 96.14, 96.15, 336, 352, 388, 392; 333/195–196, 203, 188, 204

[56] References Cited

U.S. PATENT DOCUMENTS

| 3,283,264 | 11/1966 | Papadakis ........................... 333/133 |
| 3,499,700 | 3/1970 | Harris et al. ........................ 350/382 |
| 3,506,929 | 4/1970 | Ballman et al. ..................... 350/389 |
| 3,575,487 | 4/1971 | Ohm ..................................... 350/356 |
| 4,008,947 | 2/1977 | Baües et al. ......................... 350/96.14 |

FOREIGN PATENT DOCUMENTS 52-14433 3/1977 Japan ................................. 350/356

OTHER PUBLICATIONS

Kondo et al. "Phase-Matched Electro-Optic Light Modulator", Proc. 9th Conf. on *Solid State Devices* Tokyo 8-1977. Published Japanese Jr. of *Applied Physics* vol. 17 (1978) Supp 17-1 pp. 107-112.
Yariv, A. "Coupled-Mode Theory For Guided-Wave Optics", *IEEE Jr. Quantum Electronics*, 9-1973, pp. 919-933.
White et al. "Electro-Optical Modulators Employing Intermittent Interaction", *Proc. IEEE* 1-1963, pp. 214.

*Primary Examiner*—William H. Punter
*Attorney, Agent, or Firm*—Claude A. S. Hamrick

[57] ABSTRACT

In a light wavelength separating modulator there is provided a crystal manifesting an electro-optical effect which rotates the principal axes of the refractive index ellipsoid of the crystal, a plurality of juxtaposed electrodes formed on the crystal in the direction of transmission of light and having different periods, and means for applying modulation signals to respective electrodes. When light generated by a light source, having a light spectrum where half value bandwidth exceeds 100Å, is transmitted through the modulator, a light wavelength multiplex signal transmitting apparatus is obtained; whereas when a birefringence body is located on the output side of the modulator, a light wavelength separating switch is obtained.

1 Claim, 6 Drawing Figures

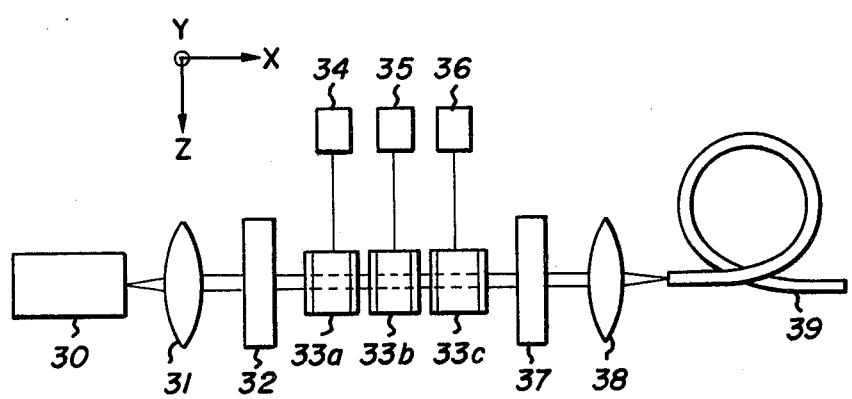
Fig_6

ELECTRO-OPTICAL LIGHT MODULATORS, LIGHT WAVELENGTH MULTIPLEX SIGNAL TRANSMITTING APPARATUS AND LIGHT WAVELENGTH SEPARATING SWITCHES UTILIZING THE SAME

BACKGROUND OF THE INVENTION

This invention relates to an electro-optical light modulator suitable for use in light communication systems, light information processing systems, light wavelength multiplex signal transmitting apparatus, light wavelength separating switches and the like.

In light communication systems and information processing systems utilizing light for the purpose of increasing transmission capacity, methods have been tried to increase the speed of modulation of the light and to use light fibers operating in a broader bandwidth for increased signal speed. However, there are practical limits to these methods which make it difficult to obtain a sufficiently large transmission capacity.

As a method of further increasing the transmission capacity, light wavelength multiplex transmission systems have been developed. In the transmitting apparatus of these prior systems, light waves having different wavelengths are independently modulated and then synthesized. To effect such modulation, light waves emitted by a plurality of semiconductor lasers, oscillating at different wavelengths, are independently modulated and then synthesized; or a plurality of laser light waves having different wavelengths are modulated with different light modulators and then synthesized.

According to the first of these two prior methods, since light sources of a number equal to the number of wavelengths to be synthesized are necessary, the transmitting apparatus of the light wavelength multiplex signal is extremely expensive. According to the latter method, it is necessary to use light modulators of a number equal to the number of wavelengths to be multiplexed. In order to synthesize modulated light waves having different wavelengths, it is necessary to use an optical system for this purpose which results in increasing the size of the apparatus.

It is also known to use photo-lithographic techniques to form a plurality of light sources and light guides for modulating and synthesizing a plurality of light waves having different wavelengths. However, in this method, application and emission of light are difficult and transmission loss is so large that the method is not practical.

Typically, a light wavelength multiplex transmission system requires a terminal device which independently modulates a plurality of light waves having different wavelengths and simultaneously transmits the modulated light waves; and, a receiving apparatus that includes a means for separating received light waves into different wavelength components and for coupling these components into different light paths. It is also necessary to provide a switch which electrically effects switching between different light paths, so as to couple, at a high speed, the light paths to a plurality of terminal devices.

Among known methods for performing wavelength separating functions are an interference filter comprising a plurality of superimposed dielectric films, a prism-shaped light analyzer utilizing the property of variation of refractive index with wavelength, and a light analyzer utilizing a diffraction grid. In all of these devices, however, the light paths are fixed for all wavelengths so that it is necessary to use another device for effecting switching between light paths. In addition, it is also necessary to provide a device for switching light paths of different wavelengths. Increases in the number of such devices not only complicate the apparatus but also decrease the reliability thereof. In order to miniaturize and decrease the cost of the apparatus, it is advantageous to decrease the number of the devices to a minimum.

SUMMARY OF THE PRESENT INVENTION

Accordingly, it is an object of this invention to provide a novel light wavelength separating modulator capable of simultaneously modulating light waves of different wavelengths with either one or a plurality of light modulators.

Another object of this invention is to provide a light wavelength multiplex signal transmitting apparatus which is compact, convenient to use, inexpensive and which has excellent performance.

A further object of this invention is to provide a light wavelength separating device which can separate incident light into components of different wavelengths and can effect electrical switching of the components at a high speed for different light paths in a manner different from that of a mere light wavelength isolating device.

One aspect of this invention provides a light wavelength separating modulator comprising at least one crystal manifesting an electro-optical effect and which produces a rotation of a principal axis of the crystal's optical indicatrix, or refractive index ellipsoid. There are also provided a plurality of electrodes formed on the crystal which have different periods and which are juxtaposed in the direction of light transmission; and a means is provided for applying independent voltages to the respective electrodes.

Another aspect of this invention provides an electro-optical light modulator comprising a plurality of crystals manifesting an electro-optical effect which produces a rotation of a principal axis of the crystals' optical indicatrices, or refractive index ellipsoids. Also included are electrodes formed on each of the crystals which have different periods in the direction of light transmission. There is also provided a means for applying independent voltages to the respective electrodes with the crystals being juxtaposed in the direction of light transmission.

Another aspect of this invention provides a light wavelength multiplex signal transmitting apparatus comprising a source of light that has a light spectrum of half value bandwidth of more than 100 Å. The apparatus also includes an electro-optical light modulator, a first optical system for applying light emitted by the light source to the modulator, a light transmitting path, and a second optical system for transmitting the light passing through the modulator to the light transmitting path. The modulator has one or a plurality of crystals manifesting an electro-optical effect which results in the rotation of a principal axis of the crystal's optical indicatrix or refractive index ellipsoid, when an electric field is applied to the crystal. There is also provided a plurality of electrodes formed on the crystals having different periods in the direction of light transmission, and a means for applying independent modulation signals to the respective electrodes, with regions of the crystal, or a plurality of crystals, being juxtaposed in the direction of light transmission.

Still another aspect of this invention is to provide a light wavelength separation switch comprising an electro-optical light modulator including a crystal manifesting an electro-optical effect which produces a rotation of a principal axis of the crystal's optical indicatrix, or refractive index ellipsoid, when an electric field is applied to the crystal. The light wavelength separation switch includes of at least two electrodes having different periods juxtaposed on the crystal's surface in a direction of light transmission, with voltage generators respectively coupled to the electrodes, and a birefringence body located on the output side of the crystal.

IN THE DRAWING

In the accompanying drawings:

FIG. 6 is an alternative embodiment to that depicted in FIG. 4.

DESCRIPTION OF THE PREFERRED EMBODIMENTS

Figure 1:
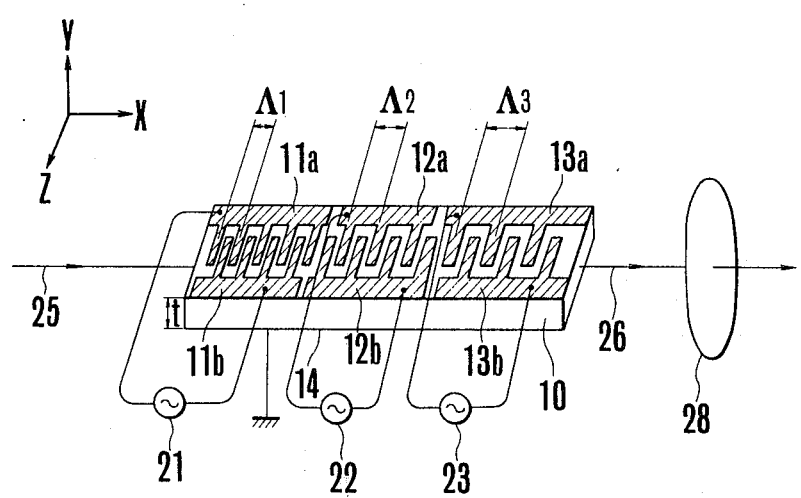
FIG. 1 is a perspective view showing one embodiment of the electro-optical light modulator of this invention.

The electro-optical light modulator of this invention is constructed such that one or more pairs of electrodes having a periodic construction in the direction of light transmission are provided on one or more crystals which manifest an electro-optical effect that produces a rotation of a principal axis of the crystal's optical indicatrix, or refractive index ellipsoid, when an appropriate electric field is applied to the crystal. A means is provided for applying modulating electrical signals to the electrodes, and the regions of the crystals provided with the electrodes are juxtaposed in the direction of light transmission. The electric field is periodically changed in a perpendicular direction to the light transmitting direction in such a manner as to separate from the incident light an independently modulated wavelength component.

A plurality of electrode pairs, each having a different periodic construction, can thus be utilized to separate a plurality of independently modulated wavelength components from the incident light.

The light wavelength multiplex signal transmitting apparatus of this invention is provided with a light source having a spectrum whose half valve bandwidth exceeds 100 Å, a light wavelength separating modulator provided on the output side of the optical system, and an optical system which is provided on the light emission side of the light wavelength separation modulator for conveying modulated wavelength multiplex signals to a light transmission path.

A birefringence body may also be located on the light emission side of the modulator, making it possible to provide a light wavelength separating device capable of switching light transmission paths at a high speed.

The electro-optical light wavelength modulator and separator of the instant invention is composed of a crystal of lithium tantalate, $LiTaO_3$, or other suitable material as will be hereinafter described. The crystal is cut and positioned such that the principal axes of its refractive index ellipsoid are formed coincident with orthogonal X, Y and Z axes, where the X-axis coincides with the direction of light transmission.

When an electric field is applied to the crystal in the Y axis direction, due to an electro-optical pockel constant $r_{42}$, the principal axes of the refractive index ellipsoid of the crystal rotates about the X axis. A light wave that is linearly polarized parallel to the Z axis of the crystal, traveling through the crystal in the X axis direction, is thereby converted into a slightly elliptically polarized light wave when it passes through the region of the crystal affected by the electric field; the light wave thus converted having a small component in the Y axis direction. When the direction of the electric field is periodically reversed along the direction of light transmission, and when the period between similarly charged electrodes is selected to have a value that satisfies equation (1) below, the aforementioned conversion of linearly polarized light becomes cumulative such that only light having a wavelength λ corresponding to the period Λ will be converted successively by the periodic electric field changes. Thus, Z axis linearly polarized incident light composed of many wavelengths passing through an electric field within the crystal, results in a conversion of the incident light for all wavelengths. When the electric field periodically reverses its direction, the light passing therethrough is converted anew with each reversal. However, only the conversion of light of wavelength λ, corresponding to period Λ, is cumulative because the periodic conversions are constructively reinforcing for light of wavelength λ due to the periodic spacing Λ. Incident light of wavelengths not corresponding to λ is not converted successively in such a manner as to be constructively reinforced.

In the following equation:

$$\frac{2\pi}{\Lambda} = \frac{2\pi}{\lambda}(n_e - n_o). \tag{1}$$

λ represents a wavelength in vacuum of incident linearly polarized light, Λ represents the period of the electric field reversal, and $n_o$ and $n_e$ represent the ordinary and extraordinary refractive indexes of the crystal.

As the passage of incident light through a region of the crystal affected by each electrode produces a small conversion of the polarization of the light, a plurality of electrodes must be positioned along the direction of travel of the light, with periodicity Λ to cumulatively produce a large conversion of the polarization of wavelength λ light. The number of such electrodes required to produce nearly 100% Y axis linearly polarized λ wavelength light from the incident light is a function of the electric field strength as well as other parameters. The details of the crystal conversion phenomenum is described by the Applicants in the *Japanese Journal of Applied Physics*, Vol. 17, 1978; Supplement 17-1, pages 107-112. The phenomenon described above is not limited to crystals of lithium tantalate but appears also in other crystals having the same electro-optical effect; for example, crystals of lead niobate.

Some embodiments of this invention will now be described with reference to the accompanying drawings. An electro-optical light modulator shown in FIG. 1 comprises a thin crystal 10 of lithium tantalate, LiTaO₃, which is cut parallel to the X-Z plane so as to transmit light in the direction of the X axis. On the crystal 10 are sequentially arranged, in the direction of the X axis, a plurality of interdigitally disposed comb-shaped electrode pairs 11a and 11b, 12a and 12b and 13a and 13b each of which have a definite spacing between the electrode teeth. The electrode teeth of the respective electrode pairs have periodic spacings of Λ1, Λ2 and Λ3. An electrode 14 is vapor-deposited over the entire bottom surface of the crystal and is connected to the ground. The periodic widths Λ1, Λ2, and Λ3 of the comb-shaped electrodes are obtained by substituting λ1, λ2 and λ3 for the value λ shown in equation (1). The thickness t in the Y axis direction of the crystal is made to be sufficiently smaller than the periods Λ1, Λ2 and Λ3.

Figure 2:
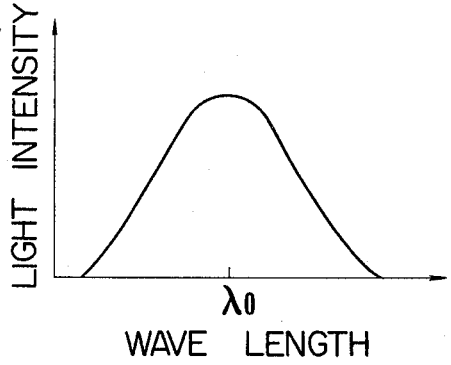
FIG. 2 is a graph showing the relationship between the wavelength of the light wave incident to the modulator shown in FIG. 1 and its light intensity distribution.

Electrodes 11a, 11b, 12a, 12b, and 13a, 13b are supplied with voltages from signal generators 21, 22 and 23, respectively. When the voltages are applied, an alternating electric field in the direction of the Y axis is created in the crystal between each of the alternatingly charged teeth of the comb-like electrodes and the ground. Light 25, linearly polarized in the direction of Z axis with a center wavelength λ0, and having a spectrum of a large half value bandwidth, such that light of wavelengths λ1, λ2 and λ3 are present, enters into the crystal 10 in the direction of the X axis. The wavelength characteristic and intensity of the incident light 25 is shown in FIG. 2. The incident light 25 can be produced by passing light emitted by a luminous diode, for example, through a polarizer. The light 26 emitted by the crystal, is passed through a filter 28 which transmits only the component polarized in the direction of the Y axis.

When voltages are not impressed upon electrodes 11a, 11b, 12a, 12b, and 13a, 13b, the light 26 emitted by the crystal 10 has only a polarized light component in the original direction of the Z axis, resulting in no light appearing on the output of the filter 28. However, when voltage is impressed across electrodes 11a and 11b, that portion of the incident light 25 near wavelength λ1, is converted into polarized light having a substantial component in the direction of the Y axis. Likewise, when voltage is impressed across electrodes 12a and 12b or electrodes 13a and 13b, only a portion of the incident light 25 near wavelength λ2 or λ3 is converted into polarized light having a substantial component in the direction of the Y axis.

Figure 3:
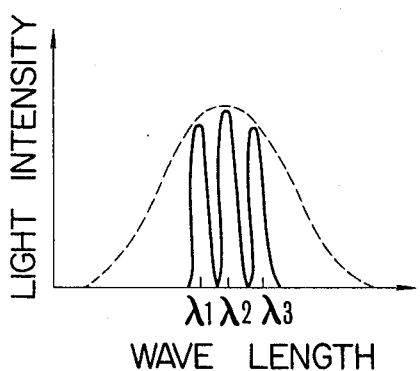
FIG. 3 is a graph showing the relationship between the wavelength of the light produced by the modulator shown in FIG. 1 and the light intensity distribution incident to the modulator shown in FIG. 2.

When voltages are simultaneously impressed across the three electrode pairs such that the polarized light components are 100% converted at their respective wavelengths, the relationship between the Y axis polarized light component of the emitted light 26 and the intensity distribution is shown by the solid lines in FIG. 3. Note that the values of λ1, λ2 and λ3 should be selected to differ by a sufficient width to enable separation. For example, where the half value bandwidth of the wavelength of the incident light 25 is equal to 500 Å, where λ0=8500 Å, and assuming that λ1= 8300 Å, λ2=8500 Å and λ3=8700 Å, and that the number of electrodes is equal to 200, then the half value bandwidth at which the conversion of the polarized light components can be efficiently performed under respective electrodes will be 150 Å if the conditions described above are to be fulfilled.

Modulation of the light wave components polarized in the Y axis direction of the transmitted light wave 26 at the respective wavelengths λ1, λ2 and λ3 is achieved by the variation of the signals generated by the respective signal generators 21, 22 and 23. It is then possible to separate these modulated light wave components by passing the emitted light 26 through the filter 28 which transmits only the light components polarized in the direction of Y axis. Thus, it is possible to provide a light wavelength separation modulator which separates incident light into a plurality of wavelength components and independently modulates the same.

Figure 4:
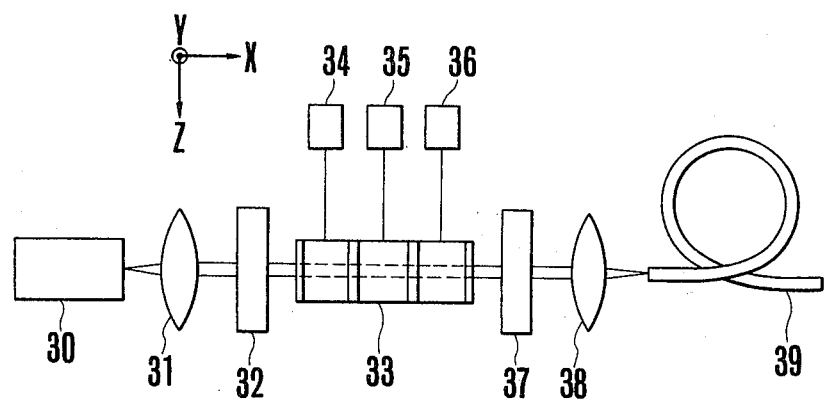
FIG. 4 is a diagrammatic representation of one embodiment of a light wavelength multiplex signal transmitting apparatus according to this invention.

A light wavelength multiplex signal transmitting apparatus will now be described. FIG. 4 is a block diagram showing one embodiment of a light wavelength multiplex signal transmitting apparatus embodying the invention. More particularly, between a light source 30, which may comprise a light emitting diode, and a light wavelength separation modulator 33, utilizing a crystal of LiTaO₃ having the same construction as that shown in FIG. 1, an optical system including lenses 31 and 32 is provided which polarizes the light emitted by the light source 30 and supplies the polarized light to the light wavelength separation modulator 33. Light wavelength separation modulator 33 is connected to, and is excited by, signal generators 34, 35 and 36, which correspond respectively to the signal generators 21, 22 and 23 shown in FIG. 1. The output side of the light wavelength separation modulator 33 is provided with an optical system 37 and 38 for conveying light to a light transmitting path, such as optical fibers. In the optical systems 31, 32 and 37, 38, lenses are used at 31 and 38, a polarizer at 32 and an analyzer or polarizing filter at 37. The light emitted by the luminous diode 30, and containing wavelength components λ1, λ2 and λ3, is converted into parallel light by lens 31. Only the polarized light component in the Z axis direction transmits through the polarizer 32 and enters into the light wavelength separation modulator 33 whose construction is the same as that shown in FIG. 1. Consequently, components of light having wavelengths of λ1, λ2, and λ3, incident on the light wavelength separation modulator, are modulated by signal generators 34, 35 and 36, respectively. And only the polarized, modulated light component in the direction of the Y axis is transmitted through the analyzer 37, collected by lens 38, and transmitted through optical fibers 39. A plurality of crystals, each provided with electrodes of different periods may be utilized in place of the single crystal modulator depicted in FIG. 4. Such a device is depicted in FIG. 6, which device is identical to that depicted in FIG. 4 except that three separate crystal modulators 33a, 33b and 33c are shown in place of the single crystal modulator 33 depicted in FIG. 4. The device depicted in FIG. 6 operates in substantially the same manner as that depicted in FIG. 4, in that light passes through the three crystals 33a, 33b and 33c just as it does through crystal 33 in FIG. 4 and modulation of the light is achieved by electrode pairs located on the crystals 33a, 33b and 33c.

Since the light wavelength multiplex signal transmitting apparatus of this invention can use a light emitting diode as a light source, it can be manufactured at a low cost. Moreover, since a single light modulator or a light wavelength separation modulator constituted by a single crystal is used, it is possible to simplify the construction of the optical system. Furthermore, as the light wavelength separation modulator of this invention utilizes an electro-optical effect, it is possible not only to obtain high modulation speed but also to simultaneously modulate light having many wavelengths using a small number of light wavelength modulators. In the illustrated example of the light wavelength multiplex signal transmitting apparatus, instead of the polarizer 32 and analyzer 37, two identical birefringence bodies (calcite, etc.), constructed to have an optical axis making an angle $\theta(0°<\theta<90°)$ with respect to the X axis in the X-Z plane, and transmitting light in the X axis direction, may be placed before and after the modulator 33. With this modified arrangement it is possible to spacially separate the incident light into two linearly polarized light components in the directions of the Y and Z axes, then modulate the polarized light components, and then separately divide out only the selected, modulated light wave components through use of the birefringence bodies replacing 37 and an optical shield plate provided with pin holes. The light wavelength multiplex signal transmitting apparatus thus created has a small light wave energy loss regardless of the polarizing condition of the light emitted by the luminous diode.

As above described, the invention provides an inexpensive light wavelength multiplex signal transmitting apparatus which is small in size, convenient to use, and has high performance. A luminous or light emitting diode, a semiconductor laser, etc., may be used as the light source of the light wavelength multiplex signal transmitting apparatus of this invention. In fact, any light source may be used so long as it can emit light waves over a wavelength band more than twice the half value bandwidth of the light which is efficiently converted when voltage is applied across a pair of electrodes. Thus any light source whose half valve bandwidth exceeds 100 Å may be utilized.

Figure 5:
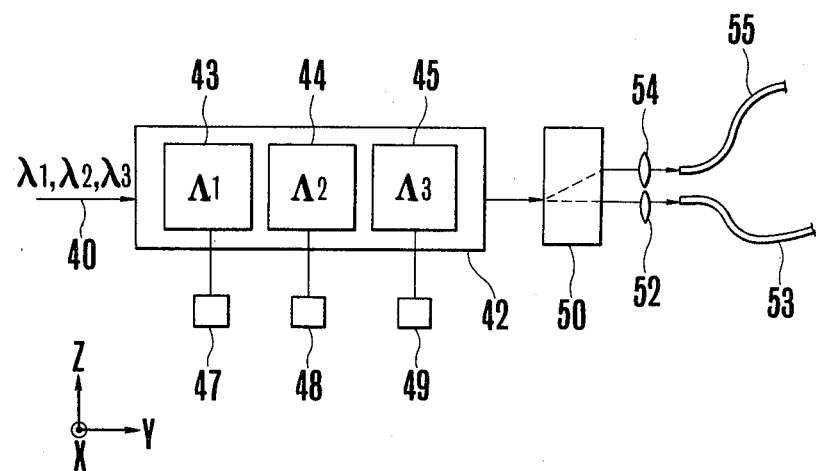
FIG. 5 is a diagrammatic representation showing one embodiment of a light wavelength separating device utilizing an electro-optical light modulator of this invention.

FIG. 5 is a block diagram showing the basic construction of still another embodiment of this invention. Note that the Y axis has been arbitrarily designated as the direction of light travel, whereas in prior FIGS. 1 and 4 the X axis was so designated. In FIG. 5, incident light 40 comprises a light wave linearly polarized in the direction of the Z axis containing three wavelength components $\lambda 1$, $\lambda 2$ and $\lambda 3$, which are independently modulated. On one surface of a lithium tantalate crystal 42 are disposed three interdigital electrode pairs 43, 44, and 45 having periods of $\Lambda 1$, $\Lambda 2$ and $\Lambda 3$, between their respective teeth. A ground electrode, not shown, is provided on the opposite surface of the crystal 42. The electrodes are supplied with voltages from voltage generators 47, 48 and 49, respectively. Parameters $\lambda 1$ and $\Lambda 1$, $\lambda 2$ and $\Lambda 2$, and $\lambda 3$ and $\Lambda 3$ are selected to satisfy equation (1). These arrangements are similar to those shown in FIGS. 1 and 4. When electrodes 43, 44, and 45 are impressed with voltages, waveform components having wavelengths $\lambda 1$, $\lambda 2$, and $\lambda 3$, respectively, are converted into polarized light components in the direction of the X axis. The light wave converted into the direction of the X axis is separated from other polarized light components by transmission through a birefringence body 50 located on the exit side of the lithium tantalate crystal 42. The polarized X-axis components are then applied to optical fibers 53 through a small lens 52. Note that the polarized light components in the direction of the Z axis transmitted through the crystal 42 are taken out in a direction different from that of the X axis component by the birefringence body. These Z axis components are then applied to other optical fibers 55 through a small lens 54. As an example, referring to FIG. 5, assume that of electrode pairs 43, 44, and 45, it is electrode pair 43 which is impressed with a voltage from voltage generator 47, the wavelength component corresponding to the period of electrode pair 43 is converted into a polarized light component in the X-axis direction and enters into optical fiber 53, whereas other wavelength components enter into optical fiber 55.

Thus, the invention provides a light wavelength separating switch which can separate a particular wavelength from a waveform containing a plurality of wavelength components, transmit the separated and remaining wavelengths through different light paths, and switch the light paths electrically at a high speed.

In various embodiments described above, when the thickness of the modulating medium is reduced, the voltage required for modulation can be reduced, thus increasing modulation efficiency. To reduce the thickness of the modulation medium, one may use a method wherein the modulation medium is mechanically ground; a method wherein the modulation medium is deposited on a substrate by vapor deposition, sputtering, etc.; a method wherein metal is diffused into the surface of the modulation medium (thus causing a light wave to transmit through the diffused layer); or a method of growing a thin film of crystal on a substrate. Any of the above-described methods may be used to provide a structure wherein the thickness of the modulation film medium is reduced to less than several tens of microns, such structure being generally referred to as a film-shaped light guide. In such a structure, the light wave is confined in the film and travels therethrough. Under these conditions, since the light wave is separated into a plurality of traveling modes, it is necessary to design the light modulator by taking into consideration an equivalent refractive index of a given traveling mode.

It should be understood that the invention is not limited to the specific embodiments described above. For example, it is possible to use a plurality of crystals each provided with electrodes of different periods. Further, the materials of the crystals, and the means for separating orthogonal polarized light components, are not limited to those shown in the embodiments. For example, mixed crystals of lithium tantalate, lithium niobate, and crystals of lead niobate can also be used. A prism-shaped birefringence body may be used as the means for separating orthogonal polarized light components. Where a crystal of lithium niobate is used, it is not necessary to use a thermostatic tank, as is necessary for the lithium tantalate crystal. In this case, however, it is advantageous to diffuse metal in the crystal in order to form the light guide structure.

What is claimed is:
1. In a light wavelength multiplex signal transmitting apparatus including a modulator comprising at least one crystal having a refractive index ellipsoid defining a principal axis and manifesting an electro-optical effect which produces rotation of the principal axis of the refractive index ellipsoid under the influence of an applied electric field, the principal axis forming a light path through said crystal, a source of light directed along said principal axis, said source of light having a light spectrum with a half value width of more than 100 Å, and light separating means associated with said crystal for converting a single incident polarized light into polarized light components, the improvement wherein there are a plurality of juxtaposed crystals each having a refractive index ellipsoid, and the light separating means comprising electrode means formed on each of said crystals for providing different periods along said principal axis and obtaining multiple modulated polarized light components, said electrode means including a plurality of pairs of comb-shaped electrodes of different periods juxtaposed along said principal axis, and power means connected to said electrode means for applying an independent voltage to each of said pair of electrodes, each of said pairs of electrodes including a first electrode and a second electrode each having a plurality of fingers, the fingers of said first electrode being interdigitally disposed relative to the fingers of said second electrode, the spacing between said fingers being uniform and different from spacing of fingers associated with other said crystals, with the voltages of said power means comprising modulated signal voltages, and birefringence means located on a light output side of said crystals for transmitting particular wavelength components of light to a plurality of light paths.

* * * * *